(No Model.)
L. WULFF.
PROCESS OF SUGAR MAKING.
No. 541,799.  Patented June 25, 1895.
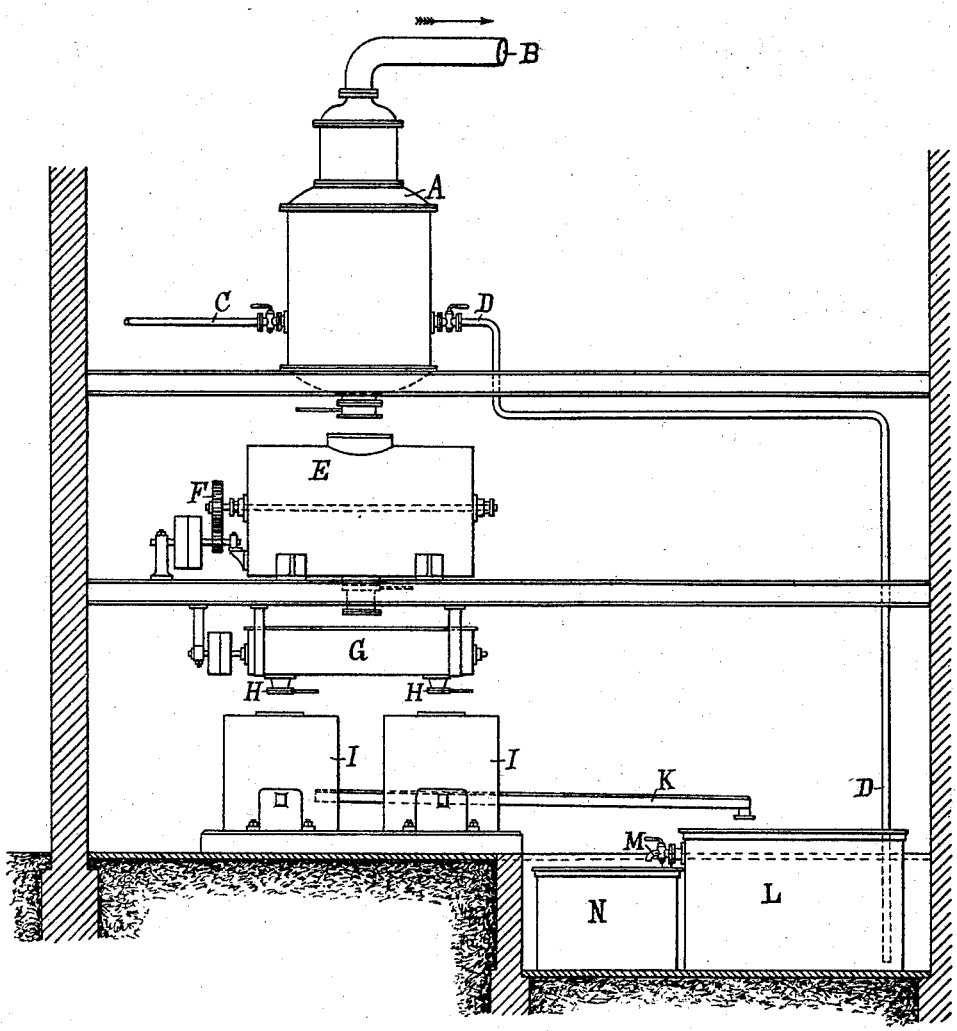
Witnesses:—
George Barry.
Inventor:—
Ludwig Wulff
by attorneys
Brown & Seward

UNITED STATES PATENT OFFICE.

LUDWIG WULFF, OF SCHWERIN, ASSIGNOR, BY MESNE ASSIGNMENTS, TO JOHANNES BOCK, OF BRESLAU, GERMANY.

PROCESS OF SUGAR-MAKING.

SPECIFICATION forming part of Letters Patent No. 541,799, dated June 25, 1895.

Application filed June 17, 1891. Serial No. 396,616. (No specimens.) Patented in Germany July 29, 1890, No. 56,867; in Belgium September 8, 1890, No. 91,924, and in Austria-Hungary December 30, 1890, No. 36,986 and No. 63,308.

*To all whom it may concern:*

Be it known that I, LUDWIG WULFF, of Schwerin, in the Grand Duchy of Mecklenburg-Schwerin, in the Empire of Germany, have invented a new and useful Improvement in the Treatment of Saccharine Solutions which have been Boiled to the Granular State, of which the following is a specification, reference being had to the accompanying drawing, forming part of this specification, and representing an elevation of the plant employed in performing the process which constitutes my invention, and for which I have obtained a German patent, No. 56,867, dated July 29, 1890; a Belgian brevet, No. 91,924, dated September 8, 1890, and a patent of Austria-Hungary, No. 36,986 and No. 63,308, dated December 30, 1890.

When the first raw sugar product or the corresponding after product of the refineries which has been subjected to granulation by boiling leaves the vacuum pan it appears to be a more or less semi-fluid mass which is allowed to cool down and entirely solidify in vats or chests and which thereafter is again brought to a semi-fluid condition by working it in a mashing machine with the addition of sirup. In closely examining such mass immediately after running out of the vacuum pan and afterward while running from the mashing machine it will be seen that an extensive after crystallization has taken place in the spaces between the original crystals which were formed in the vacuum pan and which are large and well developed. The sugar separating in the vats or chests from the sirup during the cooling of the liquor has not enlarged the existing grain by growth, but has merely formed new and very small crystals. These small crystals, even if not dissolved during the mashing operation, will be lost almost entirely while collecting the first product because the small crystals will pass together with the sirup while centrifuging through the perforations of the centrifugal sieve and will be regained only in the ejected sirup as second product. That part of the small crystals which in this way is lost to the first product will reduce the quality of that product. It is especially this characteristic of the cooled down mass—to which hitherto not enough attention has been paid in the further treatment—which accounts for the fact that especially the first products do not yield such returns or results as might be expected according to the intensity of boiling.

The general object of the present invention is to increase the yield, especially in the first crystallizing process of the sugar, and the particular object is, first, to prevent as far as possible any after crystallization, and, second, instead of adding or incorporating the small crystals (which are nevertheless formed and which escape through the perforations of the centrifugal machine) to or with the next inferior product, to add or incorporate such crystals to a product of equal or even better quality and to thus gain them in the form of well developed crystals. While thus adding the liquid product of centrifugal action to one boiling ready prepared in the vacuum pan, the sirup containing the small crystals will deliver a part of its crystallizable sugar to the well developed crystals of the more valuable product. This sirup will also dissolve the fine grain which may have been formed in the vacuum pan and will hereafter allow the sugar thus taken up to grow in addition to and with the well developed crystals.

By drawing the sirup into the boiling ready prepared and by the subsequent after-boiling a liquid is obtained, which, although all obtainable sugar is contained in it in the solid form of coarse crystals, is still fluid and can easily be drawn off.

This invention therefore is a process or method of continuous treatment of saccharine solutions boiled to grain according to which the sirup ejected from the centrifugal drum without dilution, together with its contained fine crystals originating from a preceding boiling of the same or an inferior product, is drawn into the vacuum pan after the drawing in of the thick juice or liquor and after the gradually more dense boiling down to grain; but if too large a bulk or quantity of running off sirup has accumulated, a part of such sirup, after the fine crystals have been deposited or settled from it, is withdrawn or set aside from the process for separate working and after its fine crystals have been deposited the said crystals are returned into the continuous operation, that is to say, returned at the proper time into the boiling mass in the vacuum pan.

In carrying out my invention I proceed as follows: If for example the first product of raw sugar is densely boiled down to grain, say to a condition in which it contains but from five to seven per cent. of water and forms nearly a solid mass or magma then ten to twenty per cent. of sirup is drawn into the vacuum pan and the mass is thereafter again reboiled. I prefer to heat the sirup before drawing in to a somewhat higher degree than the boiling mass in the vacuum pan, in order to enable the sirup to boil up at once in the vacuum pan and thereby to insure thorough mixing. If for instance the boiling mass is about 57° to 58° Reaumur or 160° to 162° Fahrenheit, the sirup to be drawn in should be brought to about 60° to 65° Reaumur or 167° to 178° Fahrenheit. After completion of boiling the mass is cooled down to about 30° Reaumur or 100° Fahrenheit, in a cooling crystallizator provided with an agitator for about twelve to eighteen hours and is afterward centrifuged undiluted, the sirup running off being used again for the after treatment of the next boiling of first product in the vacuum pan down to the condition of nearly solid magma.

For introducing this process at the commencement of an annual period of working I recommend to proceed in the following manner: The first boiling or mass is lightly boiled so that after thoroughly cooling down, it still contains up to about thirty per cent. of sirup. This mass is drawn off into a large cooling down crystallizator with agitator in order to cool under permanent agitation. Afterward the mass is centrifuged undiluted so that about twenty-seven per cent. of sirup with about five per cent. of the smallest crystals are ejected by centrifuging, whereas a result or yield of sixty-eight per cent. is obtained with this centrifuging. This is of course less than in the ordinary process, but the loss will be compensated for in the next centrifuging operation for the ejected sirup will be drawn in together with the five per cent. of small crystals into the vacuum pan at the next boiling after the crystallization has been completed by boiling it down to grain. The boiling mass will thereby become somewhat diluted. The crystals of the sirup while becoming heated as well as the smallest crystals of the boiling mass are dissolved again in order to grow to or enlarge the existing grain partly during the after-boiling in the vacuum pan and partly in the cooling down crystallizator. The mass thus obtained after complete cooling down contains about twice as much sirup as the first boiling and therefore, notwithstanding its being boiled more densely, is still more liquid and more easily agitated.

If the formation of grain should be the same in the second crystallization as in the first one, there would again be ejected by centrifugal action five per cent. of the fine crystals; but as the five per cent. of the fine crystals produced by the first boiling are dissolved and separated as coarse crystals, these crystals are recovered in the second centrifuging operation, that is, about seventy-three per cent. of the non-diluted liquor, and thus the ordinary good result or yield will be reached or obtained. In fact the granulation in the second crystallization is superior to the first one because while adding the sirup at the completion or end of the vacuum crystallization the smallest crystals of the boiling are dissolved and render their sugar to the coarse grain in the after-boiling so that the loss of solid sugar is not so large in the centrifugal as in the beginning and the result or yield is greater than in the ordinary process.

In the third boiling (and still more in the subsequent boiling processes) the concentration of liquor may still be further increased (because more sirup for addition is at disposal) and boiling may be extended to such density as would lead in ordinary process to the so called dry boiling so that a considerable part of that sugar which has been in a dissolved state in the running off sirup crystallizes with or enlarges the coarse crystals and thus the above described process will prove to be far more advantageous than the processes which are now generally in use. The increase in the concentration may take place in the vacuum pan or in an entirely closed cooling down crystallizator which in this instance may be connected to the air pump. Meanwhile the sirup will gradually accumulate to such an extent that part of the same must be excluded from the process. This is done by allowing such part to settle so that the fine crystals will deposit or fall to the bottom. Then part of the upper sirup is allowed to flow off and to be boiled afterward as second product, whereas the lower sirup with the fine crystals is again drawn in into the vacuum pan to join the first product.

It is not a matter of necessity to use for the process crystallizators of the kind mentioned but the cooling down may take place in chests or vats. However in this latter case the liquid mass must be mashed before undergoing the centrifugal process; but I prefer working with the cooling down crystallizators having agitators. In these crystallizators the mass is cooled down while agitated, the mass not becoming solid but remaining entirely liquid so that it may be run out of the crystallizator directly into the centrifugals.

It is obvious, first, that in my process all manual labor between the vacuum pan and the centrifugal is dispensed with. Secondly, the mass is capable of being cooled down to any desired degree by artificial cooling so that it is rendered more capable of forming crystals without forming what is known as crystal meal, that is, very small crystals in consequence of irregular refrigeration. Thirdly, there are formed no lumps of crystal grown together which would require mashing action and which would retain the sirup to a greater extent than the isolated products obtained by crystallization in motion.

In the annexed drawing I have shown a system of apparatuses for carrying out my process.

A is a vacuum pan as generally used for boiling saccharine solutions. This vacuum pan is connected at B with the air pump while C indicates the pipe for drawing in the thick juice or liquor, and D indicates the pipe for drawing in the sirup which has been ejected from the centrifugal machines.

E is the crystallizator into which the vacuum pan is capable of emptying its contents. The crystallizator is provided with a stirrer to be revolved by the gear F. The contents of the crystallizator can be emptied into the reservoir G which is also supplied with a stirrer and from which reservoir the contents may be emptied through one, two or more slide valves H H into the centrifugal machines I I. From these machines the sirup runs through the gutter K into the tank L in which the sirup is collected and from which it is drawn into the vacuum pan A by means of the pipe D. The tank L is provided at its upper part with a cock M for decanting that part of the sirup which shall from time to time be excluded from the continuous presses into the tank N. This arrangement of apparatuses has proved to answer well for working the presses above described in an economical, continuous and well regulated manner.

What I claim as my invention is—

The continuous process of treating saccharine solutions for the purpose of obtaining large sized sugar crystals therefrom, which consists in first boiling a charge of sugar juice *in vacuo* to the crystallized condition of a nearly solid mass or magma, second discharging the so crystallized mass from the vessel in which it has been so boiled into a separate vessel and cooling it in the latter while subject to mechanical agitation, third subjecting the so discharged and cooled mass to centrifugal action to expel the sirup and finer crystals therefrom, fourth boiling a fresh charge of sugar juice *in vacuo* to the same condition of magma as that first mentioned, fifth, adding to the magma last obtained the sirup and contained fine crystals from the previously boiled charge and continuing the boiling, substantially as and for the purpose herein set forth.

In testimony that I claim the foregoing as my invention I have signed my name in presence of two subscribing witnesses.

LUDWIG WULFF.

Witnesses:
GEORG RICHTER,
MARTIN KÖRNER.